United States Patent [19]  
Schnabel et al.

[11] 3,903,124  
[45] Sept. 2, 1975

[54] METHYLENE-BRIDGED DIARYL DIISOCYANATES

[75] Inventors: Wilhelm J. Schnabel, Branford; John S. Babiec, Jr., Orange; Maurice C. Raes, Branford, all of Conn.

[73] Assignee: Olin Corporation, New Haven, Conn.

[22] Filed: Nov. 15, 1973

[21] Appl. No.: 416,133

[52] U.S. Cl. ............... 260/453 AM; 260/2.5 AT; AT; 260/77.5 AT; 260/453 P

[51] Int. Cl.² .................................... C07C 119/048

[58] Field of Search .............. 260/453 AR, 453 AM

[56] References Cited

UNITED STATES PATENTS 3,255,226   6/1966   McShane, Jr. ...................... 260/453

OTHER PUBLICATIONS

Siefken, Liebig's Annalen der Chemie, Vol. 562, p. 131 (1949).

*Primary Examiner*—Lewis Gotts  
*Assistant Examiner*—Dolph H. Torrence  
*Attorney, Agent, or Firm*—F. A. Iskander; T. P. O'Day

[57]   ABSTRACT

Selected methylene-bridged diaryl diisocyanates are disclosed which are useful in the production of cellular and non-cellular polyurethanes.

6 Claims, No Drawings

METHYLENE-BRIDGED DIARYL DIISOCYANATES

This invention relates to a new and select group of methylene-bridged diaryl diisocyanates.

Various aromatic and aliphatic-aromatic isocyanates have been known which are of utility in a number of industrial applications. One of the best known compounds in this group is toluene diisocyanate which has been used extensively in various applications including the production of polyurethane elastomers and foams. One drawback connected with using this otherwise widely accepted chemical is its relatively high volatility and toxicity. Thus special, at times costly, precautionary measures must be taken in order to eliminate or minimize the hazard inherent in its use. Furthermore, in those applications which do not lend themselves to adequate atmospheric control, such as in the on-site generation of polyurethane foam for building insulation, the use of toluene diisocyanate poses special problems and in some instances may have to be altogether precluded.

It is also known in the art to prepare certain monomeric methylene-bridged aromatic isocyanates by condensing an aromatic isocyanate having a haloalkyl substituent with selected aromatic compounds. See U.S. Pat. No. 3,255,226. The products of this condensation reaction, by virtue of their relatively high molecular weight, are generally less volatile, and therefore less toxic, than toluene diisocyanate. However, these condensation products are described as being either solid or viscous liquids. As such, their use in polyurethane production, if it all practicable, entails costly handling and processing measures which often outweigh the advantages deriving from their low toxicity.

Now, in accordance with the invention, a new group of liquid methylene-bridged diaryl diisocyanate condensation products has been found which, along with their low toxicity, are surprisingly of low viscosity and relatively high reactivity. As such they are highly desirable as substitutes for toluene diisocyanate; and, further according to the invention, they are utilized to advantage in the preparation of cellular and noncellular polyurethanes.

The new diisocyanates of the invention are monomeric materials represented by formula I as follows:

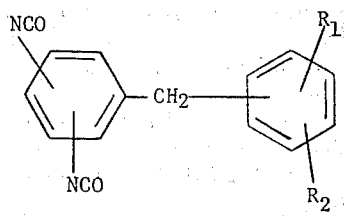

wherein $R_1$ is hydrogen or alkyl of 1-4 carbon atoms and
$R_2$ is alkyl of 1-4 carbon atoms or halogen.

The compounds of the invention can be prepared by condensing, at a temperature of about 50°–250°C and in the presence of a Friedel-Crafts catalyst, one mole of a substituted benzene with one mole of α-chlorotoluene diisocyanate. This condensation reaction is illustrated by the following equation:

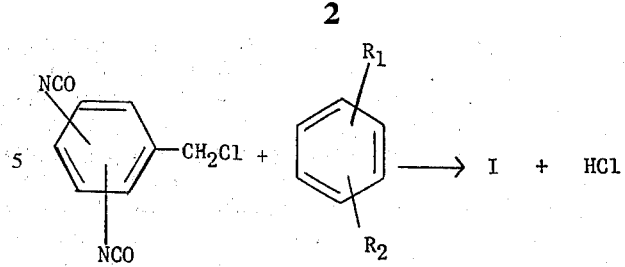

wherein $R_1$ and $R_2$ have the significance indicated above.

Completion of the reaction, which is preferably carried out using a large stoichiometric excess of the substituted benzene, is indicated when no more hydrogen chloride is evolved. The diaryl diisocyanate product is then recovered by conventional distillation methods. A more detailed description of this type of condensation reaction is provided in U.S. Pat. No. 3,255,226, issued June 7, 1966 to H. F. McShane, the entire disclosure of which is incorporated herein by reference.

As noted in the above equation, the diisocyanates of the invention are prepared from a selected group of substituted benzenes having one substituent ($R_1$) which is hydrogen or alkyl of 1–4 carbons and a second substituent ($R_2$) which is alkyl of 1–4 carbons or halogen. The preferred alkyl groups as represented by both of these substituents are methyl and ethyl, and the preferred halogen as represented by the second substituent ($R_2$) is chlorine. It is to be noted that where each of the radicals $R_1$ and $R_2$ contains two carbon atoms and these radicals are located in ortho-position on the benzene ring, they may be connected together, thereby forming a sixcarbon ring with two carbons on the benzene ring. Thus when each of these radicals contains two carbon atoms, the substituted benzene reactant can be either diethyl benzene or tetrahydronaphthalene; and correspondingly, the diisocyanate condensate of formula I can be either diisocyanatophenyl-diethylphenylmethane or diisocyanatophenyl-tetrahydronaphthylmethane, formula I above being intended to encompass both of these compounds.

Illustrative of the substituted benzenes which may be employed in preparing the diisocyanates of the invention are the following:

toluene
ethyl benzene
m-xylene
p-xylene
m-diethyl benzene
p-diethyl benzene
monochlorobenzene
o-chlorotoluene
m-chlorotoluene
p-chlorotoluene
o-ethylchlorobenzene
m-ethylchlorobenzene
tetrahydronaphthalene As noted above, the other reactant which is employed in preparing the diisocyanates of the invention is α-chlorotoluene diisocyanate. Any isomer, or mixture of isomers, of this compound may be used such as α-chloro-2,4-toluene diisocyanate, α-chloro-2,6-toluene diisocyanate, α-chloro-2,5-toluene diisocyanate, α-chloro-3,5-toluene diisocyanate, and mixtures thereof.

It is to be noted that the product of the condensation reaction is quite often a mixture of isomers which vary in proportion relative to one another. This is true even in the case where a single isomer of α-chlorotoluene diisocyanate is condensed with a single substituted benzene isomer; for inasmuch as the condensation could take place via any one of the available carbons on the substituted benzene ring, it follows for example that as many as four isomers could result when four molecules of the α-chlorotoluene diisocyanate are condensed with four molecules of a meta-substituted benzene. It is thus apparent that, as used in the specification and claims herein, formula I above is intended to iclude isomeric mixtures as well as single isomers of the compounds encompassed by that formula.

The following methylene-bridged diaryl diisocyanates are provided by way of illustrating the diisocyanates of the invention as represented by formula I above:

2,4-diisocyanato-2'-methyl-diphenylmethane
2,4-diisocyanato-4'-methyl-diphenylmethane
2,6-diisocyanato-2'-methyl-diphenylmethane
2,6-diisocyanato-4'-methyl-diphenylmethane
2,4-diisocyanato-2'-ethyl-diphenylmethane
2,4-diisocyanato-4'-ethyl-diphenylmethane
2,6-diisocyanato-2'-ethyl-diphenylmethane
2,5-diisocyanato-2'-ethyl-diphenylmethane
2,5-diisocyanato-4'-methyl-diphenylmethane
3,5-diisocyanato-2'-methyl-diphenylmethane
2,6-diisocyanato-4'-ethyl-diphenylmethane
2,4-diisocyanato-2',4'-dimethyl-diphenylmethane
2,6-diisocyanato-2',4'-dimethyl-diphenylmethane
2,4-diisocyanato-2',4'-diethyl-diphenylmethane
2,5-diisocyanato-2',4'-diethyl-diphenylmethane
2,6-diisocyanato-2',4'-diethyl-diphenylmethane
2,4-diisocyanato-2'-ethyl-4'-methyl-diphenylmethane
2,4-diisocyanato-2',5'-diethyl-diphenylmethane
2,5-diisocyanato-2',5'-diethyl-diphenylmethane
2,6-diisocyanato-2',5'-diethyl-diphenylmethane
2,4-diisocyanatophenyl-1,2,3,4-tetrahydronaphthyl-methane
2,6-diisocyanato-2'-ethyl-5'-methyl-diphenylmethane
2,6-diisocyanato-1,2,3,4-tetrahydronaphthyl-methane
2,4-diisocyanato-4'-chloro-diphenylmethane
2,5-diisocyanato-4'-chloro-diphenylmethane
2,6-diisocyanato-2'-chloro-diphenylmethane
2,6-diisocyanato-4'-chloro-diphenylmethane
2,4-diisocyanato-3'-methyl-4'-chloro-diphenylmethane
2,6-diisocyanato-3'-methyl-4'-chloro-diphenylmethane
2,4-diisocyanato-2'-methyl-5'-chloro-diphenylmethane
2,4-diisocyanato-2'-ethyl-5'-chloro-diphenylmethane For reasons of economy and commercial availability, it is preferred, in preparing the compounds of the invention, to employ α-chloro-2,4-toluene diisocyanate, α-chloro-2,6-toluene diisocyanate or a mixture of these two isomers. Accordingly the preferred compounds of the invention are those represented by formulas II and III as follows:

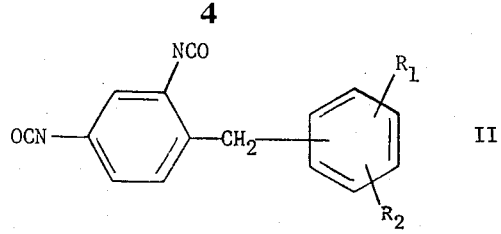

II

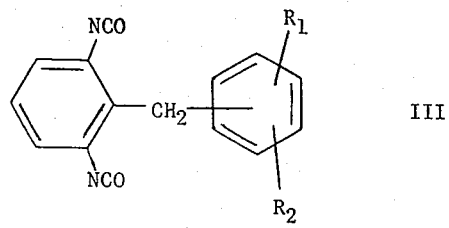

III wherein $R_1$ is hydrogen, methyl or ethyl, and
$R_2$ is methyl, ethyl, or chlorine.

As used in the specification and claims herein, it is to be understood that the compounds represented by formulas II and III above are intended to exclude the diisocyanatophenyl-tetrahydronaphthyl-methanes which are referred earlier as being encompassed by formula I above. Thus illustrative of the compounds represented by formulas II and III are the following:

2,4-diisocyanato-2'-methyl-diphenylmethane
2,4-diisocyanato-4'-methyl-diphenylmethane
2,6-diisocyanato-2'-methyl-diphenylmethane
2,6-diisocyanato-4'-methyl-diphenylmethane
2,4-diisocyanato-2'-ethyl-diphenylmethane
2,4-diisocyanato-4'-ethyl-diphenylmethane
2,6-diisocyanato-2'-ethyl-diphenylmethane
2,6-diisocyanato-4'-ethyl-diphenylmethane
2,4-diisocyanato-2',4'-dimethyl-diphenylmethane
2,6-diisocyanato-2',4'-dimethyl-diphenylmethane
2,4-diisocyanato-2',4'-diethyl-diphenylmethane
2,6-diisocyanato-2',4'-diethyl-diphenylmethane
2,4-diisocyanato-2'-ethyl-4'-methyl-diphenylmethane
2,4-diisocyanato-2',5'-diethyl-diphenylmethane
2,6-diisocyanato-2',5'-diethyl-diphenylmethane
2,6-diisocyanato-2'-ethyl-5'-methyl-diphenylmethane
2,4-diisocyanato-4'-chloro-diphenylmethane
2,6-diisocyanato-2'-chloro-diphenylmethane
2,6-diisocyanato-4'-chloro-diphenylmethane
2,4-diisocyanato-3'-methyl-4'-chloro-diphenylmethane
2,6-diisocyanato-3'-methyl-4'-chloro-diphenylmethane
2,4-diisocyanato-2'-methyl-5'-chloro-diphenylmethane
2,4-diisocyanato-2'-ethyl-5'-chloro-diphenylmethane In accordance with a particularly preferred embodiment of the invention, an isomeric mixture of α-chloro-2,4-toluene diisocyanate and α-chloro-2,6-toluene diisocyanate is used in preparing the diisocyanates of the invention. Pursuant to this embodiment, a particularly preferred group of the invention compounds is that which is represented by an isomeric mixture of the two diisocyanates represented by formulas II and III above. Illustrative such isomeric mixtures include:

a mixture of 2,4- and 2,6-diisocyanatophenyl-methylphenyl-methane a mixture of 2,4- and 2,6-diisocyanatophenyl-ethylphenyl-methane a mixture of 2,4- and 2,6-diisocyanatophenyl-dimethylphenyl-methane a mixture of 2,4- and 2,6-diisocyanatophenyl-diethylphenyl-methane a mixture of 2,4- and 2,6-diisocyanatophenyl-chlorophenyl-methane a mixture of 2,4- and 2,6-diisocyanatophenyl-methylchlorophenyl-methane a mixture of 2,4- and 2,6-diisocyanatophenyl-ethylchlorophenyl-methane Along with being liquid, the methylene-bridged diaryl diisocyanates of the invention, unlike similar prior art compounds, have a surprisingly low viscosity. Thus at 25°C., practically all of the diaryl diisocyanates represented by formulas II and III above have a viscosity below about 85 cps. and the majority of these have a viscosity ranging from about 20 to about 70 cps. In addition, the compounds of the invention have the further attributes of being more reactive than toluene diisocyanate while at the same time being less volatile and therefore less toxic. As such, they are highly desirable as replacements for toluene diisocyanate. They are particularly suitable for use in those applications which require low toxicity without sacrificing otherwise desirable properties found in toluene diisocyanate.

In accordance with the invention, the methylene-bridged diaryl diisocyanates of the invention are utilized to advantage in the production of polyurethanes, including cellular and non-cellular materials. Thus for example, they can be reacted with a polyol in the presence of a catalyst and a foaming agent to produce polyurethane foams for use in numerous applications including the manufacture of cushioning materials, insulation, and various other structural and home furnishing applications.

The following examples are provided to illustrate the invention. In these examples, all parts and percentages are by weight unless otherwise specified.

EXAMPLE 1

In a reaction vessel equipped with a thermometer, nitrogen gas inlet tube, and a stirrer, there were placed 276 grams (3.0 moles) of toluene and 13.4 grams of anhydrous aluminum chloride. The mixture was heated to 110°C and then 216 grams (1.0 mole) of technical grade α-chlorotoluene diisocyanate were added gradually while maintaining the temperature inside the reaction vessel within 110°–120°C. The diisocyanate material was made up of an 80/20 by weight isomer mixture of α-chloro-2,4- and α-chloro-2,6-toluene diisocyanate. During the entire reaction period, a slow stream of dry nitrogen gas was passed through the reaction mixture. Hydrogen chloride evolved in the course of reaction was captured in a separate vessel where it was absorbed in water. After a total of 10 hours reaction time, during which two additional amounts, 6.7 grams each, of aluminum chloride were added, the evolution of hydrogen chloride ceased. The total yield of this gas was determined by titration with a base as representing 77% of theory based on complete reaction of the α-chlorotoluene diisocyanate. Substantially all the unreacted toluene was removed by distillation. Fractional distillation of the remaining reaction product mixture gave 118 grams of pure liquid product distilling at about 168°–170°C and 0.5–1.0 mm of mercury pressure. This product consisted of a mixture of 2,4-diisocyanatophenyl-methylphenyl-methane and 2,6-diisocyanatophenyl-methylphenyl-methane. The structure and identity of the product were confirmed by mass spectrometry (MS), nuclear magnetic resonance (NMR), and vapor phase chromatography (VPC). Titration for NCO further confirmed the product.

The product had a measured viscosity of 25 cps. at 25°C. Its NCO reactivity was determined to be 1.3 times that of toluene diisocyanate. The following is a detailed description of the test used to determine reactivity.

The test compares exotherm data obtained on reacting a particular isocyanate with dipropylene glycol, as compared with the data obtained on reacting toluene diisocyanate with the same glycol, under standardized conditions. The temperature rise, which is a function of the speed of reaction, is recorded and plotted against time. Relative reactivity values are then obtained by comparing the slopes of the exotherm curves for toluene diisocyanate and the isocyanate in question based on an assigned value of 1.0 for the slope characterizing the exotherm curve that is obtained for toluene diisocyanate.

Procedurally, 11.5 milliequivalents of toluene diisocyanate, 1.0 ml. of methyl ethyl ketone, and 4.0 mls. of dipropylene glycol are placed in a test tube equipped with a stopper and a thermocouple which is connected to a time-temperature recorder. The test tube is shaken for 10 seconds and then placed in an insulating rigid foam block. A time-temperature curve is plotted based on the data provided by the time-temperature recorder.

The same procedure is repeated using the isocyanate in question, in this case the product of Example 1, instead of toluene diisocyanate.

After the curves are plotted, the rate of temperature rise ($\Delta$ T/sec.) is determined for each curve covering the region between the 50 second elapsed time mark and the 100 second elapsed time mark on the curve. Based on the assigned reactivity value of 1.0 for the rate obtained for toluene diisocyanate, the reactivity of the isocyanate in question is calculated. For example, if the rate of temperature rise for toluene diisocyanate is X°C/sec. and that of the other isocyanate is Y°C/sec., then the reactivity of the other isocyanate is determined according to the following equation:

$$\text{Reactivity} = \frac{Y}{X} \times 1$$

In the case of the product of Example 1, an NCO reactivity of 1.3 was calculated based on a rate of temperature rise for this material of 0.18°C/sec. and a corresponding rate for toluene diisocyanate of 0.14°C/sec. Thus $$\text{Reactivity} = \frac{0.18}{0.14} \times 1 = 1.3$$

EXAMPLES 2-8

Following the general procedure of Example 1, methylene-bridged diaryl diisocyanate compositions were prepared by condensing equi-molar proportions of α-chlorotoluene diisocyanate, as used in Example 1, with various substituted benzenes which are identified in Table I below. The substituted benzenes were used in large excess, i.e., 3–10 moles per mole of α-chlorotoluene diisocyanate. In the case of each of Examples 2–8, the condensation product was an isomeric mixture corresponding to the isomeric mixture of reactants used in its preparation. The identity and structure of the condensation product, as described in Table I, were confirmed by MS, NMR, NCO titration and VPC. The viscosity and NCO reactivity of each product was determined following the procedure of Example 1, and the results are also recorded in Table I below.

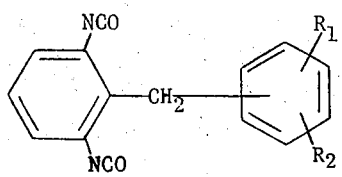

wherein, as applied to both of said formulas,
$R_1$ is hydrogen, methyl or ethyl, and
$R_2$ is methyl, ethyl or chlorine.

2. An isomeric mixture as claimed in claim 1 selected from the group consisting of
    a mixture of 2,4- and 2,6-diisocyanatophenyl-methylphenyl-methane,
    a mixture of 2,4- and 2,6-diisocyanatophenyl-ethylphenyl-methane,
    a mixture of 2,4- and 2,6-diisocyanatophenyl-dimethylphenyl-methane,

TABLE I

Compositions Derived From Substituted Benzenes and Isomeric Mixture of α-Chloro-2,4- and 2,6-TDI

| Ex. No. | Substituted Benzene Used | Product Obtained | Product Viscosity (cps. at 25°C) | Product NCO Reactivity |
|---|---|---|---|---|
| 1 | toluene | diisocyanatophenyl-methylphenyl-methane | 25 | 1.3 |
| 2 | ethylbenzene | diisocyanatophenyl-ethylphenyl-methane | 25 | 1.5 |
| 3 | m-xylene | diisocyanatophenyl-m-dimethylphenyl-methane | 35 | 1.4 |
| 4 | diethylbenzene (m- & p- isomer mixt.) | diisocyanatophenyl-m-diethylphenyl-methane and diisocyanatophenyl-p-diethylphenyl-methane | 70 | 1.1 |
| 5 | monochlorobenzene | diisocyanatophenyl-chlorophenyl-methane | 20 | 1.7 |
| 6 | o-chlorotoluene | diisocyanatophenyl-o-methylchlorophenyl-methane | 75 | 1.7 |
| 7 | p-chlorotoluene | diisocyanatophenyl-p-methylchlorophenyl-methane | 80 | 1.7 |
| 8 | tetrahydronaphthalene | diisocyanatophenyl-tetrahydronaphthyl-methane | 220 | 1.2 |

What is claimed is:

1. An isomeric mixture of
    a. a first methylene-bridged diaryl diisocyanate of the formula

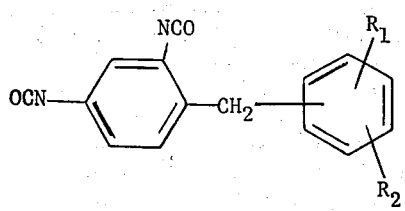

and
    b. a second methylene-bridged diaryl diisocyanate of the formula a mixture of 2,4- and 2,6-diisocyanatophenyl-diethylphenyl-methane,
a mixture of 2,4- and 2,6-diisocyanatophenyl-chlorophenyl-methane,
a mixture of 2,4- and 2,6-diisocyanatophenyl-methylchlorophenyl-methane, and
a mixture of 2,4- and 2,6-diisocyanatophenyl-ethylchlorophenyl-methane.

3. An isomeric mixture as claimed in claim 2 which is a mixture of 2,4- and 2,6 diisocyanatophenyl-methylphenyl-methane.

4. An isomeric mixture as claimed in claim 2 which is a mixture of 2,4- and 2,6-diisocyanatophenyl-ethylphenyl-methane.

5. An isomeric mixture as claimed in claim 2 which is a mixture of 2,4- and 2,6-diisocyanatophenyl-m-dimethylphenyl-methane.

6. An isomeric mixture as claimed in claim 2 which is a mixture of 2-4- and 2,6-diisocyanatophenyl-chlorophenyl-methane.

* * * * *